United States Patent Office 3,637,601
Patented Jan. 25, 1972

3,637,601
SULFUR-CONTAINING POLYAMIDE DYE
RECEPTION PROMOTERS
William E. Truce, Lafayette, Ind., and Elizabeth G.
Horvath, Bartlesville, Okla., assignors to Phillips Petroleum Company
No Drawing. Continuation of application Ser. No.
654,681, July 20, 1967. This application Jan. 22,
1970, Ser. No. 6,022
Int. Cl. C08g 20/20
U.S. Cl. 260—78 R                                                11 Claims

ABSTRACT OF THE DISCLOSURE

Sulfur-containing polyesters and polyamides are produced by reacting a mixed dianhydride of a dicarboxylic acid and a sulfonic acid with a glycol and/or a diamine or by reacting a dicarboxylic acid, a sulfonyl halide and a glycol and/or a diamine in the presence of a base. The sulfur-containing polyamides and polyesters are combined with conventional polyamides, polyesters, or polyolefins as dye reception promoters.

This application is a streamlined continuation of U.S. application Ser. No. 654,681, filed July 20, 1967, now abandoned.

This invention relates to novel polyamides and polyesters. In another aspect this invention relates to a method of increasing the dye reception of polyamide, polyester, and polyolefin fibers by combining known polyamides, polyesters, and polyolefins with the novel polyamides and polyesters of this invention. In yet another aspect this invention relates to a manufactured fiber having improved dye reception characteristics.

Synthetic fibers and films, in particular those made from polyamides and polyesters, have found a wide employment in fulfilling man's needs and desires for clothing, shelter, recreation, and the like. In the continuing improvement of such materials there is a need for improved dyeability and color retention. A number of processes, such as treating with various reagents, have been proposed to improve the dyeability of polyamides and polyesters.

We have now discovered novel polyamides and polyesters, which when combined with conventional polyamides, polyesters, and polyolefins greatly improve the dyeability and color retention of such polymers.

Accordingly, it is an object of the invention to produce novel polyamides and novel polyesters which are useful as dye reception promoters.

Another object of the invention is to improve the dyeability and color retention of conventional polyamides, polyesters, and polyolefins.

These and other objects will be apparent to one skilled in the art upon consideration of the description and appended claims.

The sulfur-containing polyesters and polyamides of this invention are characterized by containing from about 3 to about 50 ester or amide linkages per molecule. They are further characterized by the fact that they contain from 0.01 to 8 percent by weight of sulfur, based on the weight of polymer. These novel polyesters and polyamides will be described in detail with the description of the methods of preparing the same.

The polymers of this invention can be prepared by one of two methods. As to the first method of production, the polymers of this invention can be prepared by contacting a mixed dianhydride of a carboxylic acid and a sulfonic acid with a glycol and/or a diamine. Although it is preferred to use either a glycol or diamine, a mixture of the two can be used without departing from the scope of this invention. Use of a mixture of diamine and glycol results in a mixed polymer containing both amide and ester linkages.

The mixed dianhydride can be prepared from a heavy metal hydrocarbyl sulfonate such as silver p-toluene sulfonate and a diacyl halide such as terephthaloyl chloride. The heavy metal moiety of the heavy metal sulfonate can be Ag, Pb, Hg, Au, and the like, and the hydrocarbyl sulfonate moiety can be chosen from hydrocarbyl sulfonates such as alkyl, cycloalkyl, aryl, or combinations thereof such as aralkyl, alkaryl, and the like sulfonates. The hydrocarbyl part of the hydrocarbyl sulfonate moiety can contain from about 1 to about 30 carbon atoms, preferably about 1 to 8 carbon atoms. The diacyl halide can be represented as follows:

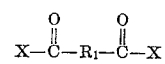

where $x$ can be halogen, and $R_1$ can be a divalent hydrocarbyl moiety such as alkylene, arylene, cycloalkylene, or combinations thereof such as aralkylene, alkarylene, and the like containing from about 2 to about 30 carbon atoms, preferably about 4 to 10 carbon atoms.

The glycols that can be employed can be represented as: HO—$R_2$—OH, where $R_2$ is an organic moiety with a valence of 2 containing from 2 to about 50,000 carbon atoms, preferably about 2 to 50 carbon atoms. The following are representative of $R_2$: ethylene, hexylene, polymeric organic radicals of ethylene oxide initiated by a glycol, butadiene polymeric radicals and the like provided that no part of the organic radical is deleterious to the polymerization reaction.

As an example of this type of reaction, the dianhydride represented as:

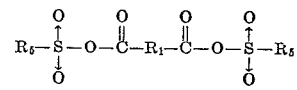

where $R_1$ is as previously stated and $R_5$ is a hydrocarbyl radical such as alkyl, cycloalkyl, aryl, or combinations thereof such as alkaryl, aralkyl, and the like containing from 1 to about 30 carbon atoms, preferably about 1 to 8 carbon atoms, is reacted with the above-described glycol to produce the novel sulfur-containing polyester. The reaction is represented as below:

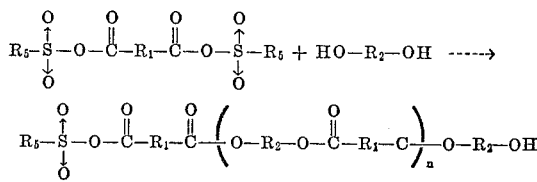

The $R_1$, $R_2$, and $R_5$ of the sulfur-containing polyester are as previously recited and $n$ is an integer between 1 and about 50.

The diamines that can be similarly employed to contact with the mixed dianhydrides can be acyclic, represented as:

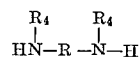

where $R_4$ can be H, alkyl, cycloalkyl, aryl, or combinations thereof containing to about 8 carbon atoms, and $R_2$ can be as presented above; or cyclic, represented as:

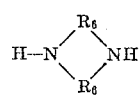

where $R_6$ can be alkylene having from 1 to 8 carbon atoms, preferably 2 to 4 carbon atoms. Examples of such cyclic compounds include piperazine, 2,5-dimethylpiperazine, 2,6-diethylpiperazine, and the like. As an example of this type of reaction, the dianhydride is reacted with the amine previously described. An example of the reaction is represented below:

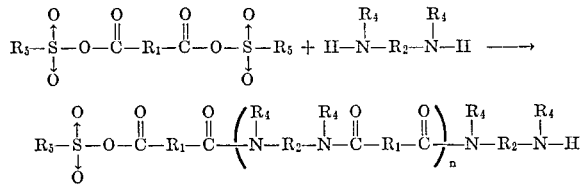

The $R_1$, $R_2$, $R_4$, $R_5$, and $n$ in the sulfur-containing polyamide are as previously defined with respect to the sulfur-containing polyester.

This reaction to form the novel sulfur-containing polymers of this invention can be carried out by several methods. In general, about 1 mole of mixed dianhydride should be provided for each mole of diamine and/or glycol, though reasonable variation from this 1:1 ratio can be employed. Though both superatmospheric or subatmospheric pressures can be employed, atmospheric pressure if often most convenient. Temperatures between about 10° C. and 150° C. can be employed, as can suitable diluents that do not deleteriously affect the reaction. Either pure glycols or mixtures of glycols can be employed, as can either pure diamines or mixtures of diamines or mixtures of glycols and diamines.

In the second method of preparation, a novel in situ process for preparing the sulfur-containing polyamides and polyesters of this invention, a sulfonyl halide, a dicarboxylic acid, and a diamine and/or a glycol are contacted in the presence of a suitable base.

The sulfonyl halides suitable for employment can be represented as:

where $x$ can be a halo radical and where $R_5$ can be as previously described.

The dicarboxylic acids suitable for use in this method can be represented as:

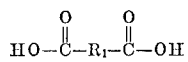

where $R_1$ is as previously defined. The diamines and glycols used in this method are those which were previously described, and they can be used in analogous manner and proportion. An example of such a process can be represented by the following in which the glycol is employed:

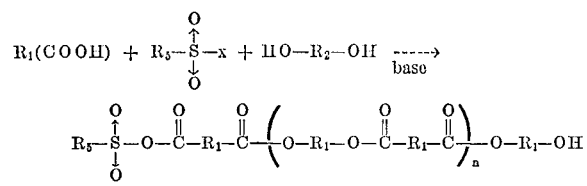

The following is an example of the in situ reaction utilizing diamines:

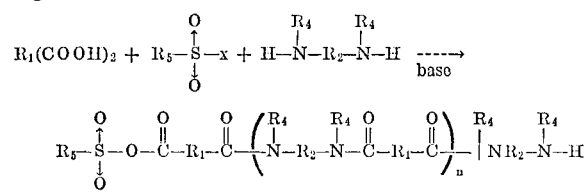

where $R_1$, $R_2$, $R_4$, $R_5$, $x$, and $n$ are as previously defined. It can be seen that for each mole of dicarboxylic acid employed, about 2 moles of sulfonyl halide and 1 mole of glycol and/or diamine should be employed. Of course, these proportions can vary within reasonable limits.

Various techniques for condensation can be employed to contact the reactants and form the condensation products of this invention. For instance, solution polymerization, interfacial polymerization, and the like can be used as suitable techniques. Any suitable diluent that does not have a deleterious effect on polymerization can be employed. For instance, N-methyl-2-pyrrolidone, chloroform, dioxane, ethyl ether, methylene chloride, and the like can be used. Temperatures between about −20° C. and 150° C. can be employed, and either subatmospheric or superatmospheric pressure can be employed, although atmospheric pressure and room temperature are often convenient. In general, sufficient temperature and pressure should be employed to effect the reaction in a reasonable length of time and to maintain the reactants in a liquid state. The reactants are contacted for sufficient time to effect the degree of condensation desired. Though the reaction components can be contacted in any order desired, the dicarboxylic acid is preferably contacted with the sulfonyl halide in the presence of the base before the other components are contacted.

The base material to be employed in the in situ reaction system as a promoter can be any moderately weak base that does not deleteriously affect the conversion. Some examples of such bases include triethylamine, pyridine, N-methyl-pyrrolidone, sodium carbonate, sodium bicarbonate, potassium carbonate, triisobutylamine, zinc hydroxide, piperidine, beryllium hydroxide, and the like.

The sulfur-containing polymer of the invention can be combined with other polymers such as conventional polyamides, polyesters, and polyolefins. In one embodiment, a nylon was combined with the polymers of this invention. In another embodiment, the novel sulfur-containing polyamide was blended with a polypropylene.

Polyamides, polyesters, and polyolefins are rendered more receptive to dyes when combined with novel sulfur-containing polyamides and polyesters. Such novel sulfur-containing polyesters and polyamides can be combined with the conventional polyamides, polyesters, and polyolefins, by any method known to the art, in amounts generally in the range of 1 to 90 percent of the weight of the combined polymer or more. The novel polymers of this invention can be blended with the respective conventional polymers as a melt, a solution, an emulsion, or the like. The invention is especially applicable to improving the dyeability of homopolymers and copolymers of hydrocarbons having 2 to 8 carbon atoms per molecule. Molecular weights of the polymers of this invention can be in the same general range, or can be higher or lower, than that of the polyesters, polyamides, or polyolefins to which they are additives with higher or lower molecular weight than that of the material to which they are added will provide products with highly desirable characteristics.

The amount of the sulfur-containing polymers of this invention that can be combined with a conventional polymer containing the respective amide or ester linkage can vary from about 1 to about 90 percent of the combined polymer weight. Specifically, a range of about 5 to about 90 percent of the combined polymer weight gives excellent results when combining the novel polyamide with a conventional polyamide or when combining the novel polyester with a conventional polyester.

The sulfur-containing polyamides of the invention can be combined with conventional polyesters or polyolefins in an amount ranging from about 1 to 20 weight percent of the combined weight to improve dyeability. Likewise, the sulfur-containing polyesters of the invention can be combined with conventional polyamides or polyolefins in an amount ranging from about 1 to 20 weight percent of the combined weight.

According to this invention, the polymers are blended prior to being made into fibers, films, or the like. Thus, the polymers of this invention are blended with other polymers as described earlier prior to processing, then subjected to a processing step such as spinning or fabrication into films, and then dyed. The resulting dyed products have significantly greater dye reception characteristics than had the novel polymers of this invention not been added. As a result of this, the dyed product has a more intense color and is a more valuable product.

The following examples further illustrate the invention.

EXAMPLE I

To a stirred reactor were charged a quantity of dicarboxylic acid, a quantity of base, and 150 ml. of diluent. The quantity of dicarboxylic acid varied with each run, but sufficient base was charged in each run to provide 2 moles of base per mole of dicarboxylic acid. After the reactor contents had been stirred at room temperature for about 30 minutes, sufficient methane sulfonyl chloride was charged to provide 2 moles of methane sulfonyl chloride for each mole of dicarboxylic acid, and the reactor temperature was lowered to about 0° C. A composition comprised of sufficient diamine to provide 1 mole of diamine for each mole of dicarboxylic acid, sufficient additional base to provide a total of 4 moles of base per mole of dicarboxylic acid, and 100 ml. of diluent were then charged to the reactor. A reaction occurred upon contact of the components, and a precipitate formed. The reactor was then brought to room temperature, and stirring was continued for 1 hour. The reaction was then allowed to continue for varying additional lengths of time without stirring. The precipitate was then filtered from the other materials, washed with water, washed with dilute sodium bicarbonate, washed with water, washed with acetone, and dried in vacuo. The following table presents data for a series of runs with 1,6-hexanediamine as the diamine employed:

TABLE II

Run No. 1:
- Glycol _____ (1)
- Dicarboxylic acid _____ (2)
- Diluent system _____ (3)
- Reactant conc.[4] _____ 0.32
- Melting point (° C.) _____ 59

[1] Hexylene glycol.
[2] Sebacic acid.
[3] CHCl$_3$.
[4] Reactant concentration of each monomer is given as moles of reactant per liter of reactor contents; for example, to run 1 were charged 0.31 mole of ethylene glycol and 0.31 mole of adipic acid per liter of reactor contents.

This example demonstrates that sulfur-containing polyesters can also be prodced by the process of this invention.

EXAMPLE III

A quantity of terephthaloyl bis(p-toluenesulfonate) was prepared from silver p-toluene sulfonate and terephthaloyl chloride. This mixed anhydride (3.21 gm.) was then reacted with an equal molar amount of m-xylene-alpha, alphadiamine in the presence of twice an equal molar amount of triethylamine. A solvent comprised of 100 ml. of dichloromethane and 150 ml. tetrahydrofuran was employed. Reaction time was 5 minutes. The product was filtered, washed with methanol, washed with water, and washed with acetone before drying in a vacuum. A 68 percent yield was obtained on a weight basis [actual yield (100)/theoretical yield] and the inherent viscosity was 0.17 in m-cresol at 30° C.

This example demonstrates that the polyamide of the invention can be produced by contacting a mixed anhydride of a dicarboxylic acid and a sulfonic acid with a diamine in the presence of a suitable base.

EXAMPLE IV

To a stirred reactor were charged a quantity of diamine, a quantity of triethylamine, and 100 ml. of diluent. The quantity of diamine varied with each run, but sufficient

TABLE I

| Run No. | Dicarboxylic acid | Dicarboxylic acid conc.[a] | Diluent system | Base | Reaction time (hours) | Yield, percent (wt.) | Melt point, ° C. | Inherent viscosity [b] |
|---|---|---|---|---|---|---|---|---|
| 1 | Sebacic | 0.48 | CHCl$_3$ | (C$_2$H$_5$)$_3$N | 1 | 70 | 250 | 0.15 |
| 2 | do | 0.67 | NMP [c] | (C$_2$H$_5$)$_3$N | 1 | 62 | 240 | 0.10 |
| 3 | Adipic | 0.22 | Dioxane | (C$_2$H$_5$)$_3$N | 16 | 46 | 230 | 0.17 |
| 4 | do | 0.31 | do | Pyridine | 2 | 19 | 190 | |
| 5 | do | 0.31 | do | Na$_2$CO$_3$ [d] | 2 | 10 | 220 | |
| 6 | do | 0.36 | do | Pyridine [e] | 2 | 19 | 180 | |

[a] Concentration is in moles of dicarboxylic acid per liter of reaction contents.
[b] Inherent viscosity was determined in m-cresol at 30° C.
[c] NMP is N-methylpyrrolidone.
[d] Na$_2$CO$_3$ was in the form of an anhydrous slurry.
[e] The pyridine was charged to the dicarboxylic acid in one increment rather than two as was the base in the other runs.

The polymers of this invention as exemplified above were characterized as polyamides by infrared analysis.

This example demonstrates that the in situ process of this invention effects the production of sulfur-containing polyamides. Also demonstrated by the runs shown above is the fact that this process is effective for various dicarboxylic acids, various concentrations of reactants, various diluent systems, various bases, and various charge orders.

EXAMPLE II

Glycols were substituted for diamines in the procedure of Example I. The following table presents data pertinent to the formation of polyesters instead of polyamides by the process of this invention. The base employed was triethylamine.

triethylamine was charged in each run to provide 2 moles of triethylamine per mole of diamine. To this stirred mixture was charged a composition, comprised of 100 ml. of diluent, sufficient triethylamine to provide 2 additional moles of triethylamine per mole of diamine, sufficient sebacic acid to provide 1 mole of dicarboxylic acid for each mole of diamine, and sufficient methane sulfonyl chloride to provide 2 moles of methane sulfonyl chloride for each mole of diamine, that had been stirred on an ice bath for 5 minutes and at room temperature for 5 additional minutes. After charging, the combined mixtures were stirred for 10 minutes, the precipitate that formed was filtered, and the precipitate was washed repeatedly in water and then in methanol. The following table presents data for a series of runs:

TABLE III

| Run No. | Diamine employed | Mono concentration [a] Diamine | Mono concentration [a] Diacid | Diluent For diamine | Diluent For diacid | Yield [b] (percent) | Melting point, [c] °C | Inherent viscosity [d] |
|---|---|---|---|---|---|---|---|---|
| 1 | 1,6-hexanediamine | 6.67 | 9.15 | $CH_2Cl_2$ | $CH_2Cl_2$ | 55 | (e) | Insoluble |
| 2 | do | 2.56 | 2.32 | NMP [f] | $CH_2Cl_2$ | 34 | 190 | 0.01 |
| 3 | 1,2-dodecane diamine | 1.99 | 2.01 | NMP [f] | $CH_2Cl_2$ | 40 | 150 | 0.12 |
| 4 | m-Xylene-a,a'-diamine | 1.73 | 2.21 | Cl-⌬ | Cl-⌬ | 28 | 160 | 0.15 |
| 5 | m-Xylene diamine | 1.51 | 1.93 | $CH_2Cl_2$ | $CH_2Cl_2$ | 38 | 180 | 0.10 |
| 6 [g] | m-Xylylene diamine | 1.62 | 2.07 | $CH_2Cl_2$ | $CH_2Cl_2$ | 15 | 180 | 0.07 |
| 7 | do | 3.54 | 3.96 | THF [h] | THF [h] | 20 | 210 | 0.13 |

[a] Concentrations of both diamines and diacids are expressed as grams of either diamine or diacid per 100 milliliters of reactor contents, respectively.
[b] Yield is expressed in terms of grams of polymer produced per grams of polymer theoretically possible.
[c] Hot bar melting point.
[d] In m-cresol at 30° C.
[e] Softening without melting.
[f] NMP is N-methyl-2-pyrrolidone.
[g] Potassium carbonate rather than triethylamine was used as a base in slurry form.
[h] THF is tetrahydrofuran.

The data of this example shows that a variety of diamines, a variety of diluent systems, and a variety of reaction techniques can be employed to obtain the sulfur-containing compounds of the invention.

EXAMPLE V

To a stirred reactor were charged 0.0272 mole adipic acid, 0.0544 mole of triethylamine, and 60 ml. of methylene chloride. The reactor was cooled to about 0° C., 4.14 ml. of methane sulfonyl chloride was charged, and the reactor contents were stirred for 1.75 hours. The contents of the first reactor were then charged to a second stirred reactor that contained 0.0272 mole of 1,6-hexanediamine and 0.0544 mole of triethylamine and 50 ml. N-methyl pyrrolidone. The reactor contents exhibited an exotherm, i.e., reaction, upon contact and a thick precipitate formed. The methylene chloride was removed by vacuum and a slow increase in temperature over about 40 minutes. After most of the methylene chloride had been removed, the temperature was increased to about 130° C. to form a solution of the reactor contents. The temperature was maintained at this level for 2.5 hours. Cooling was then effected and the product that precipitated was filtered, washed with water, and washed with acetone. Yield was 77 percent of the theoretical. Inherent viscosity in m-cresol at 30° C. was 0.03, and the hot bar melting point was 200° C.

This example demonstrates yet another procedure for effecting the in situ production of the sulfur-containing polyamides of this invention.

EXAMPLE VI

The polyamide polymers of this invention as exemplified by the polymers of Examples I, III, IV, and V were determined by standard sulfur analysis techniques to contain about 3 percent by weight of sulfur. Such polymers were blended with commercial nylons. For instance, 10 parts by weight of polyamide produced in Run 1, Example I, were blended with 90 parts by weight of a commercial polyamide (nylon-66) that had been produced by a conventional melt procedure. The dyeability of such blends that had been fabricated into films was compared with that of unblended commercial polyamide. In all cases, the blends exhibited markedly improved dyeability when dyeing was effected with a commercially available dye.

In one run, a sample of nylon-66 (Zytel 101) (i) containing 10 percent by weight of the polymer product of Run 1, Example I, was pressed at 265° C. at 9 p.s.i. for 1 minute and 2000 p.s.i. for 1 minute to form a film. In like manner, in another run, a sample of the same nylon-66 without an admixture of the polymers of this invention was pressed into a film.

When 1 gm. samples of film of the two runs were immersed in a dye solution [comprised of .02 gm. of a commercially available cationic type dye, 0.15 percent Triton x–100 (j) emulsifier, sufficient sodium carbonate to obtain a pH of 10, and sufficient water to have 50 ml. of solution] for 1 hour at 95° C., and then immersed in a solution of 0.05 gm. of Triton x–100 and 0.0025 gm. of sodium carbonate in 50 ml. aqueous solution for 15 minutes at 70° C., the blended sample was found to have been dyed a considerably more intense color.

(i) Nylon-66 is a polyamide with 6 carbons in each carbon chain between each amide moiety and is produced by a conventional melt polymerization process (Zytel 101 is a trade name for such a polymer).

(j) Triton x-100 is a trade name for a sodium alkylaryl polyether sulfonate emulsifier.

This example clearly demonstrates that the sulfur-containing polymers of this invention are valuable products for improving the dyeability of commercial polymeric products.

EXAMPLE VII

A blend of 90 weight percent polypropylene and 10 weight percent polymer product of Run 1, Example I, was pressed at 265° C. at 9 p.s.i. for 1 minute and 2000 p.s.i. for 1 minute to form a film. The same type of polypropylene, without the sulfur-containing polyamide of the invention, was pressed in like manner to form a second film. Half of each film sample was dyed in a solution containing 3 weight percent of a commercially available acid dye. The other half of each film was dyed in a solution containing a commercially available disperse dye.

The dyeability with both the acid and the disperse dye was improved by incorporating the polyamide of the invention, demonstrating their utilities as dye reception promoters.

Reasonable modification and variation are within the scope of this invention which sets forth novel polymer compositions, methods for producing the composition, and uses for the compositions.

We claim:
1. A composition of matter consisting of a sulfur-containing polymer having the following formula:

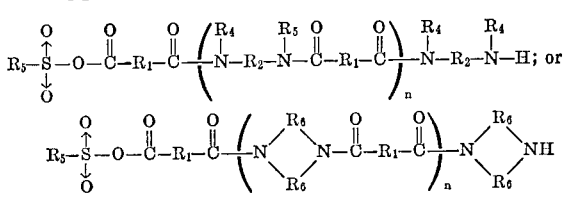

where $R_1$ is a divalent hydrocarbon radical containing from 2 to 30 carbon atoms; $R_2$ is a divalent organic radical selected from the group consisting of alkylene radicals containing from 2 to 50 carbon atoms, polymeric organic radicals of ethylene oxide initiated by a glycol and containing up to 50 carbon atoms, butadiene polymeric radicals containing up to 50 carbon atoms, arylene, alkarylene or arylenedialkylene radicals containing up to 50 carbon atoms; $R_4$ is selected from the group consisting of hydrogen and monovalent hydrocarbon radicals containing from 1 to 8 carbon atoms; $R_5$ is a monovalent hydrogen radical containing from 1 to 30 carbon atoms; $R_6$ is an alkylene radical containing from 1 to 8 carbon atoms; and $n$ is an integer from 1 to about 50; said polymer containing from 0.01 to about 8 percent by weight of sulfur, based on the weight of polymer.

2. A composition of matter according to claim 1 having the formula

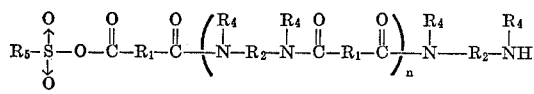

or

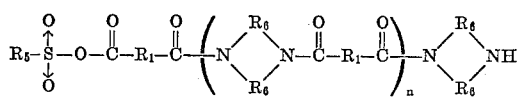

where $R_1$ is a divalent hydrocarbon radical selected from the group consisting alkylene, cycloalkylene, arylene, aralkylene or alkarylene radicals containing up to 30 carbon atoms; $R_2$ is a divalent organic radical selected from the group consisting of alkylene radicals containing from 2 to 50 carbon atoms; polymeric organic radicals of ethylene oxide initiated by a glycol and containing up to 50 carbon atoms, butadiene polymeric radicals containing up to 50 carbon atoms; arylene, alkarylene or arylenedialkylene radicals containing up to 50 carbon atoms; $R_4$ is selected from the group consisting of hydrogen and alkyl, cycloalkyl or aryl radicals containing up to 8 carbon atoms; $R_5$ is an alkyl, cycloalkyl or aryl radical containing up to 30 carbon atoms; $R_6$ is an alkylene radical containing up to 8 carbon atoms; and $n$ is an integer from 1 to about 50; said polymer containing from 0.01 to about 8 percent by weight of sulfur, based on the weight of polymer.

3. A composition of matter according to claim 1 wherein $R_1$ is selected from the group consisting of alkylene radicals containing up to 30 carbon atoms or cycloalkylene, arylene, aralkylene or alkarylene radicals containing up to 10 carbon atoms; and $R_5$ is selected from the group consisting of alkyl, cycloalkyl, aryl, aralkyl or alkaryl radicals containing up to 30 carbon atoms.

4. A composition of matter according to claim 3 wherein $R_5$ is selected from the class consisting of alkyl, cycloalkyl, aryl, aralkyl or alkaryl radicals containing up to 8 carbon atoms.

5. A composition of matter according to claim 4 wherein $R_1$ is selected from the group consisting of alkylene, cycloalkylene, arylene, aralkylene or alkarylene radicals containing up to 10 carbon atoms.

6. A composition of matter in accordance with claim 4 wherein $R_1$ contains from 4 to 10 carbon atoms; $R_5$ contains from 1 to 8 carbon atoms; and $R_6$ contains from 2 to 4 carbon atoms.

7. A composition of matter in accordance with claim 4 wherein $R_1$ is alkylene of 8 carbon atoms, $R_2$ is alkylene of 6 carbon atoms, $R_4$ is hydrogen and $R_5$ is methyl.

8. A composition of matter in accordance with claim 4 wherein $R_1$ is alkylene of 4 carbon atoms, $R_2$ is alkylene of 6 carbon atoms, $R_4$ is hydrogen and $R_5$ is methyl.

9. A composition of matter in accordance with claim 4 wherein $R_1$ is phenylene, $R_2$ is xylylene, $R_4$ is hydrogen, and $R_5$ is tolyl.

10. A composition of matter in accordance with claim 4 wherein $R_1$ is alkylene of 8 carbon atoms, $R_2$ is xylylene, $R_4$ is hydrogen and $R_5$ is methyl.

11. A composition of matter in accordance with claim 4 wherein $R_1$ is alkylene of 8 carbon atoms, $R_2$ is alkylene of 12 carbon atoms, $R_4$ is hydrogen and $R_5$ is methyl.

References Cited
UNITED STATES PATENTS

| | | | |
|---|---|---|---|
| 2,130,948 | 9/1938 | Carothers | 260—78 |
| 2,913,433 | 11/1959 | Wittbecker | 260—78 |
| 3,142,662 | 7/1964 | Huffman | 260—78 |
| 3,235,533 | 2/1966 | Brinkman | 260—78 |
| 3,296,204 | 1/1967 | Caldwell | 260—78 |
| 3,409,596 | 11/1968 | Unger et al. | 260—78 |

HAROLD D. ANDERSON, Primary Examiner

U.S. Cl. X.R.

8—55 R; 260—33.4 R, 75 S, 268 PL, 545 R, 857 R, 857 L, 860 R, 873 R

UNITED STATES PATENT OFFICE
CERTIFICATE OF CORRECTION

Patent No. 3,637,601                Dated: January 25, 1972

William E. Truce et al

It is certified that error appears in the above-identified patent and that said Letters Patent are hereby corrected as shown below:

Column 8, lines 65-68, delete the formula there shown and substitute therefor the following formula

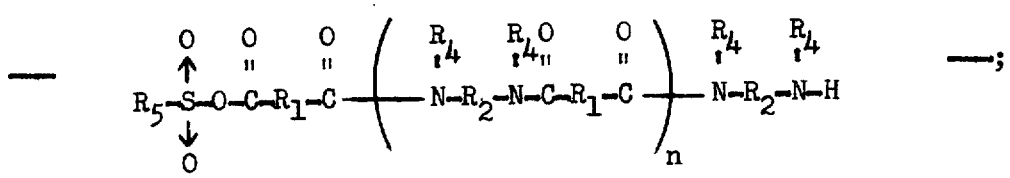

Column 9, line 8, delete "hydrogen" and substitute therefor — hydrocarbon —; and Column 10, line 13, delete "wheerin" and substitute therefor — wherein —.

Signed and sealed this 18th day of July 1972.

(SEAL)
Attest:

WARD M. FLETCHER, JR.           ROBERT GOTTSCHALK
Attesting Officer               Commissioner of Patents